United States Patent [19]

McCloskey

[11] 4,450,703

[45] May 29, 1984

[54] ROD ENDS AND BLANKS AND METHOD AND APPARATUS FOR MAKING SAME

[75] Inventor: John A. McCloskey, Fairfield, Conn.

[73] Assignee: Incom International Inc., Pittsburgh, Pa.

[21] Appl. No.: 224,876

[22] Filed: Jan. 14, 1981

[51] Int. Cl.³ ............................................. B21D 37/16
[52] U.S. Cl. ....................................... 72/342; 72/356; 72/364; 29/149.5 B
[58] Field of Search ................. 29/149.5 B, 149.5 DP, 29/423; 72/342, 364, 356

[56] References Cited

U.S. PATENT DOCUMENTS

| | | | |
|---|---|---|---|
| 1,751,758 | 3/1930 | Ray ........................................ | 29/423 |
| 2,836,706 | 5/1982 | Cavenaugh ........................ | 72/342 X |
| 3,124,877 | 3/1964 | Macchini ........................... | 72/364 X |
| 3,396,567 | 8/1968 | Bachmann ........................ | 72/364 X |
| 3,412,611 | 11/1968 | Eccles et al. ..................... | 72/342 |
| 3,818,746 | 6/1974 | Fujita .................................. | 72/342 |
| 3,877,281 | 4/1975 | Shimizu ............................. | 72/364 |
| 3,897,616 | 8/1975 | Williams ........................... | 29/149.5 B |
| 4,144,626 | 3/1979 | McCowen ....................... | 29/149.5 B |
| 4,222,260 | 9/1980 | McDermott ..................... | 22/342 X |

*Primary Examiner*—Leon Gilden
*Attorney, Agent, or Firm*—James C. Wray

[57] ABSTRACT

A cold header or a screw machine preforms a rod end blank from rod stock. A female blank has a drilled and tapped rod portion and an undersized spherical head portion. A male blank has an unthreaded straight shank and an undersized spherical head portion. The rod portion is necked adjacent the head portion. The blank is placed on an indexing table which advances the blank through a series of processing stations. The head portion is heated for three seconds with an induction coil, rested for one second, and heated again for three seconds with an induction coil. The head portion is then flattened, shaped and enlarged in a closed die press. The head portion is quenched to room temperature. The head portion is punched in a die punch to remove the slug and flash.

26 Claims, 9 Drawing Figures

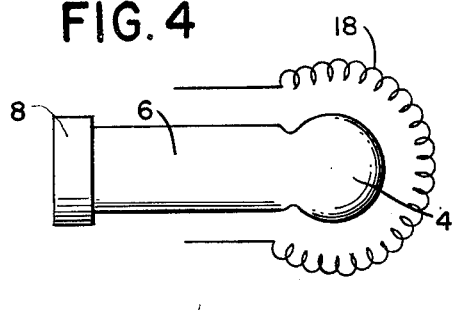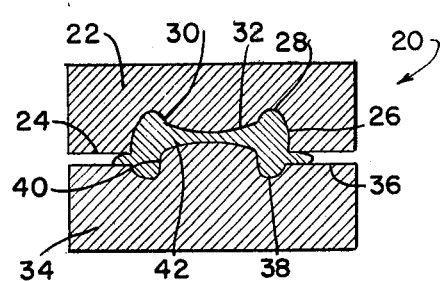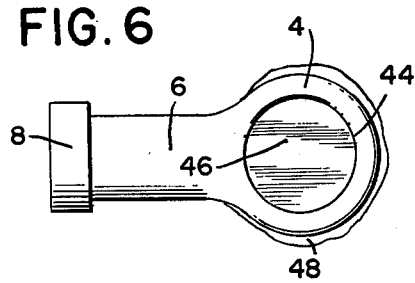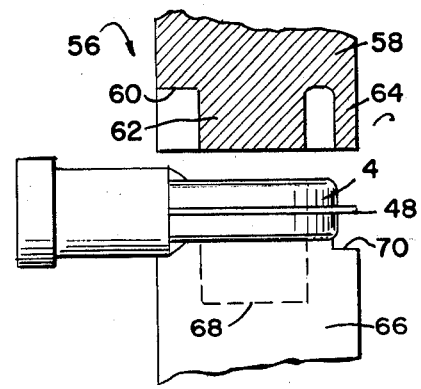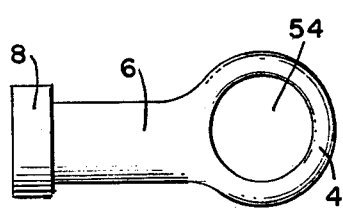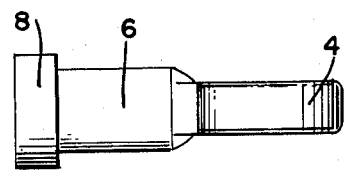

ROD ENDS AND BLANKS AND METHOD AND APPARATUS FOR MAKING SAME

BACKGROUND OF THE INVENTION

This invention relates generally to metal working and more particularly has reference to rod ends and a method and apparatus for hot forming the same.

Pertinent United States and foreign patents are found in Class 148, subclasses 11.5R and 154; Class 29, subclass 7; Class 72, subclasses 342, 362 and 364 of the Official Classifications of Patents in the U.S. Pat. and Trademark Office.

Examples of pertinent patents are U.S. Pat. Nos.

| | |
|---|---|
| 3,842,644 | 3,842,234 |
| 2,475,348 | 1,909,982 |
| 2,381,246 | 1,983,618 |
| 2,343,453 | 3,818,746 |
| 2,276,521 | |

U.S. Pat. No. 3,842,644 shows a method, machine and article. Induction heating is used to heat the portion of a bar to be compacted. An initial section of the bar is positioned in an inductive field produced by one or several inductors. Axial pressure for compacting is then applied. Piercing is not mentioned.

U.S. Pat. No. 2,475,384 shows an apparatus and method for inductive heating. The apparatus and method are specifically directed to induction heating of an elongated article and confining the heating to a narrow portion of the article.

U.S. Pat. No. 2,381,246 shows an induction heating coil for heating a rapidly moving elongated metallic strip.

U.S. Pat. No. 2,343,453 shows an induction heating device providing an improved control system for controlling the supply of energy from a high frequency oscillation generator to a coupling coil.

U.S. Pat. No. 2,276,521 shows a method for forming and working metal elements. The apparatus heats the rod with a high frequency induction coil.

U.S. Pat. No. 3,842,234 shows an inductor for inductively heating metal work pieces. A single inductor is used to heat work pieces having differing contours or differing axial lengths.

U.S. Pat. No. 1,909,982 shows an induction furnace. No flattening or piercing is taught.

U.S. Pat. No. 1,983,618 shows a forging apparatus wherein tubular blanks are formed from bar stock by a single pass of the forging apparatus. An improved punching mechanism is also shown.

U.S. Pat. No. 3,818,746 shows a method for cold forming a rod end having a rod portion and a substantially flat head portion.

Rod ends having tapped rod portions and bearing support openings in head portions are well known. Various methods and devices have been used to make such rod ends and many of them are ineffective or inefficient.

In one known method, rod ends are formed by machining oversized rod stock to a desired size and shape. That method is unsatisfactory because it wastes stock and because it produces a weak product.

In another known method, rod end blanks are preformed with tapped rod portions. The head portion is then cold worked to the desired size and shape. That method is unsatisfactory because the threads in the rod portion tend to deform when the head portion is cold worked.

In yet another known method, the bearing support opening is drilled into the head portion of the rod end blank. That method is unsatisfactory because drilling is a relatively expensive and time consuming procedure.

The need for improved rod ends and methods and apparatus for making the same is readily apparent.

SUMMARY OF THE INVENTION

The present invention overcomes many of the problems which exist in the prior art methods and devices. The present invention provides high strength rod ends for spherical or anti-friction bearings and further provides a method and apparatus for economically and effectively making the same.

Male and female rod end blanks are preformed from rod stock on a screw machine or cold threader. The screw machine is preferred for the female blanks and the cold header is preferred for the male blanks. The female blanks have a cylindrical rod portion which is drilled and tapped at one end and necked at the other end. The necked portion is connected to a spherical head portion of the blank. The head portion is undersized, i.e., the diameter of the head portion is less than the desired head portion diameter in the finished rod end. The male blanks differ only in that the rod portion is unthreaded.

The blank is advanced through a series of processing stations by an indexing table. The blank is received on the table at the first station. At the second and third stations, the head portion of the blank is heated for three seconds with an induction coil. The blank is moved from the second station to the third station in one second. At the fourth station, the head portion is flattened, shaped and enlarged in a closed die press. The head portion is quenched to room temperature at the fifth station. At the sixth station, the head portion is punched to remove the slug and flash. The rod end is removed from the indexing table at the next station.

The rod end has a relatively strong head portion as the result of the hot working of the metal at the pressing station.

An object of the invention is, therefore, to provide an improved rod end blank and rod end.

Another object of the invention is to provide an improved rod end having a strong head portion.

Yet another object of the invention is to provide a rod end which can be economically and efficiently manufactured.

Still another object of the invention is to provide an improved method and apparatus for making rod ends.

Another object of the invention is to provide an improved method and apparatus for making rod ends wherein induction heating is used.

Yet another object of the invention is to provide a method and apparatus for making rod ends which avoids the need for drilling the head portion.

Another object of the invention is to provide a method of making rod ends comprising providing rod end blanks having undersized head portions, heating the head portions by induction, and pressing the heated head portions thereby enlarging said head portions to a desired size.

These and other and further objects and features of the invention are apparent in the disclosure which includes the above and below specification and claims and drawings.

BRIEF DESCRIPTION OF THE DRAWINGS

FIG. 4 is a side elevational view of an induction heating arrangement of the present invention.

FIG. 5 is a sectional view of the die press of the present invention.

FIG. 6 is a plan view of the rod end of the present invention.

FIG. 7 is a side elevational view, partly in section, of the die punch of the present invention.

FIG. 8 is a plan view of a rod end of the present invention.

FIG. 9 is a side elevational view of the rod end shown in FIG. 8.

DETAILED DESCRIPTION OF THE INVENTION

Figure 1:
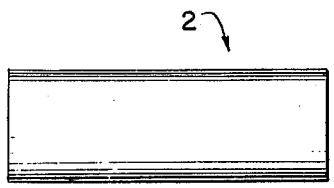
FIG. 1 is a side elevational view of rod stock used in the present invention.

Referring to FIG. 1, the rod stock used in the present invention is indicated generally by the numeral 2. The rod stock 2 has a cylindrical shape and preferably has a diameter of 11/16 of an inch. The rod stock 2 can be formed of any metal which is known to be useful in making rod ends for spherical or anti-friction bearings.

The rod stock 2 is inserted in a conventional automatic screw machine which preforms the stock 2 into the rod end blanks of the present invention.

Figure 2:
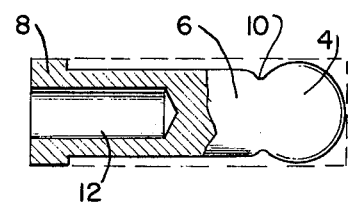
FIG. 2 is a side elevational view of the rod end blank of the present invention.

The rod end blank of the present invention is shown in FIG. 2. The blank has an undersized spherical head portion 4 and a cylindrical rod portion 6. The rod portion 6 terminates in a flange 8. The diameter of the head portion 4 is equal to the diameter of the flange 8, that diameter being equal to the diameter of the original rod stock 2.

The rod portion 6 is provided with a reduced diameter neck portion 10 adjacent the head portion 4. The neck portion 10 prevents flow back when the head portion is hot worked in a manner described later.

The rod portion 6 is further provided with a threaded axial bore 12. Preferably, the threaded bore 12 is formed by automatically drilling and tapping the rod stock 2 in the screw machine.

Figure 3:
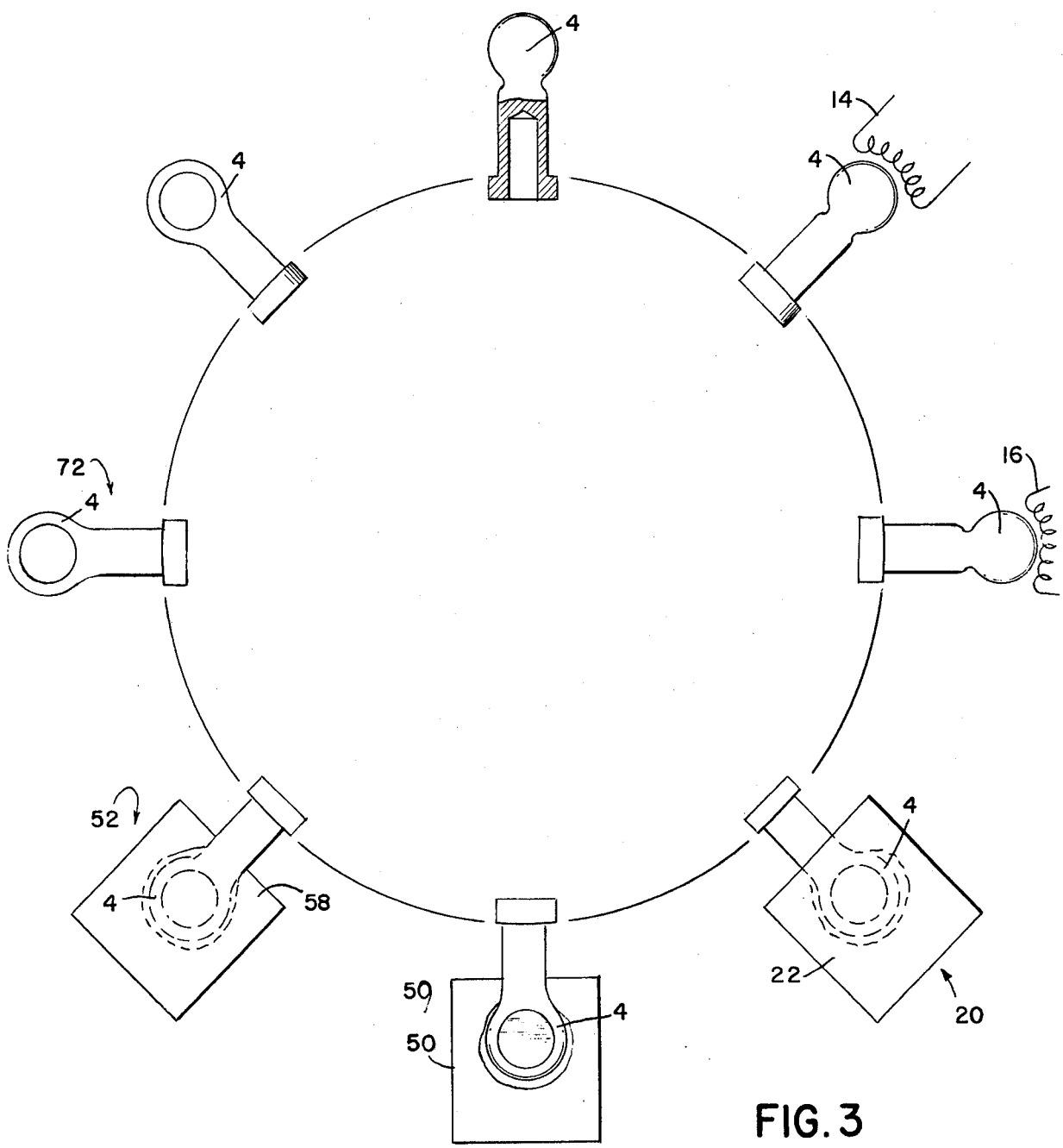
FIG. 3 is a schematic diagram of the indexing table and processing stations of the present invention.

The preformed rod end blank is placed on an eight-place indexing table which moves the blank through a series of processing stations shown schematically in FIG. 3.

The blank is received on the indexing table at the first station.

The head is then advanced through stations where it is heated, rested and reheated sequentially one or more times before hot forming. Degrees, periods and numbers of heats, rests and reheats are chosen according to material and size to provide full heat penetration to cherry red with minimal surface disruption.

In the preferred embodiment, the head portion of the blank is positioned adjacent an induction coil 14 at the second station. The coil 14 is connected to a source of electric current. Current flowing through the coil 14 causes induction heating of the head portion 4.

The third station is similar to the second station. The indexing table positions the head portion 4 of the blank adjacent an induction coil 16 connected to a source of electric current. The head portion is inductively heated by the coil.

As shown in FIG. 3, the induction coils 14 and 16 can be arranged linearly and oriented along an axis perpendicular to the longitudinal axis of the blank. The coils 14 and 16 are spaced slightly from the forward end of the head portion 4. Alternatively, the coils can be arranged arcuately about the head portion 4 as shown in FIG. 4. In the latter arrangement, the coils would lie in a plane perpendicular to the direction of movement of the blank.

Preferably, the head portion 4 is heated at the second station for about 3 seconds. The blank is then moved immediately to the third station where the head portion 4 is heated for three additional seconds.

The heating causes the head portion 4 to become cherry red.

The blank moves from the second station to the third station in about one second. During that time, induction heating ceases and the head portion 4 is exposed to air at ambient temperature. Heat introduced at the first station diffuses from the surface of the head portion 4 into the interior of the head portion 4.

It is possible to provide a single induction heating station where the head portion 4 is heated continuously for six seconds. However, it has been shown that such a procedure results in heat being concentrated on the surface of the head portion 4. That condition is unsatisfactory because it inhibits material flow during the press operations described in the following paragraph.

The heated blank is moved immediately from the second heating station to a press station where the head portion is flattened and radially enlarged.

The press station includes a closed die press 20 shown in FIG. 5. The upper die 22 has a work surface 24 provided with a cylindrical recess 26 and a groove 28 disposed about a cylindrical elevation 30 in the recess 26. The elevation 30 has a convex end 32. The lower die 34 has a work surface 36 provided with a groove 38 disposed about an upwardly tapering projection 40. The projection 40 has a convex end 42.

The heated head portion 4 of the blank is placed between the work surfaces 24 and 36 of the die press 20. One or both of the work surfaces 24 and 26 are translated toward the head portion 4, thereby pressing the head portion between the work surfaces 24 and 36. The pressure on the heated head portion 4 causes the material in the head portion to flow and form flattened surfaces having shapes dictated by the configurations of the work surfaces 24 and 36. The convex portions 32 and 42 of the work surfaces 24 and 36 urge the material to flow outwardly, thereby radially enlarging the head portion 4.

Heating the head portion 4 prior to pressing allows the material in the head portion 4 to flow easily under pressure without causing distortion of the rod portion 6 of the blank. If desired, a plug can be placed in the threaded bore 12 of the rod portion 6 to further preserve the screw threads during the heating and pressing steps.

In addition to shaping and enlarging the head portion, the heating and pressing steps have the effect of working the material in the head portion 4. That produces a head portion 4 which is stronger than the original rod stock 2.

When the head portion 4 is removed from the die press 20, it has an appearance best shown in FIG. 6.

Both sides of the head portion 4 have central depressions 44 which were formed by the actions of the cylindrical elevation 30 and upwardly tapering projection 40. The center of the head portion 4 is a relatively flat slug 46. A thin flash 48 extends radially from the outer surface of the head portion 4.

The rod end is moved to a quenching station 50. The rod end is immersed in an oil bath which cools it to room temperature. Quenching prevents continued flow of material in the head portion 4 during the piercing and trimming operations discussed later.

Immersion of the rod end in the quenching oil may present a smoke or fire hazard. For that reason, it may be desired to locate the quenching station 50 remote from the other processing stations. The rod end can be moved between the indexing table and the quenching station 50 on a conveyor. A portion of the conveyor can be submerged in the oil bath so that the rod end can be quenched without being removed from the conveyor.

Quenched rod ends are moved to piercing and trimming station 52 where the slug 46 and flash 48 are removed from the head portion 4. As shown in FIGS. 8 and 9, the removal of the slug 46 produces an axial opening 54 extending through the head portion 4. That opening 54 is configured to receive a spherical or anti-friction bearing assembly.

The piercing and trimming station 52 has a die punch 56. The upper die 58 has a work surface 60 provided with a central cylindrical portion 62 and a peripheral portion 64. The lower die 66 is provided with a central recess 68 and a peripheral shoulder 70.

The head portion 4 is placed on the lower die 66 and the central depression 44 in the lower surface of the head portion 4 is aligned with the central recess 68. The upper die 58 is translated under pressure toward the lower die 66. The central cylindrical portion 62 of the upper die 58 pierces the head portion 4 by severing the slug 46 from the head portion 4 and driving the slug 46 into the central recess 68. The peripheral portion 64 of the upper die 58 severs the flash 48 from the head portion 4 and drives the flash 48 onto the shoulder 70.

The rod end is advanced to a discharge station 72 where it is removed from the indexing table.

The method and apparatus of the present invention have several advantages in addition to those already mentioned.

The present invention avoids the waste problem associated with prior art methods of machining oversized rod stock. As previously noted, the present rod end is formed from rod stock having a diameter of 11/16 inches. The prior art machining technique would require rod stock having a diameter of 1 inch to produce a rod end of identical size.

The present invention also avoids the high drilling costs associated with the prior art. The present invention completely eliminates the need for drilling to form the opening through the head portion of the rod end. The present invention substantially reduces the cost of drilling the female screw connection by drilling and tapping the rod end blank in the screw machine.

The present invention is also less expensive and less problematic than methods based on cold forging. Cold forging requires a larger head portion on the blank and thus necessitates higher raw material costs. Cold forging of the head portion also tends to distort the screw threads in the female screw connection, a problem which is avoided by the present invention.

While the invention has been described with reference to specific embodiments, the exact nature and scope of the invention is defined in the following claims.

I claim:

1. A method of making rod ends having at one end thereof tapped rod portions and at the opposite end bearing supporting surfaces comprising
   providing rod stock,
   forming a rod end blank from said rod stock, said blank having a tapped rod portion at one end of desired size and shape terminating at the opposite end in a radially undersized spherical head portion, said rod portion being necked adjacent the head portion and being provided with an axial threaded bore,
   plugging the threaded bore prior to heating the head portion to prevent distortion of said threaded bore by said heating and pressing,
   heating the head portion by induction heating,
   pressing the heated head portion in a die press to flatten and thereby radially enlarge said head portion to desired size and shape, thereby transforming the spherical head portion into a flat bearing supporting surface,
   quenching the pressed head portion in an oil bath, and
   piercing the quenched head portion in a die punch.

2. The method of claim 1 wherein the rod end blank is formed from said rod stock on a screw machine.

3. The method of claim 1 wherein the rod end blank has a spherical head portion.

4. The method of claim 1 wherein the rod portion of the blank is necked adjacent said head portion.

5. The method of claim 1 wherein the step of heating the head portion comprises
   heating the head portion by induction for about 6 seconds.

6. The method of claim 1 wherein the step of heating the head portion comprises
   heating the head portion by induction for about 3 seconds,
   exposing the heated head portion to air at ambient temperature for about 1 second after said 3 seconds, and
   reheating the head portion by induction for about 3 seconds after said 1 second.

7. The method of claim 1 wherein the step of heating the head portion comprises
   providing an induction heating coil,
   placing the head portion adjacent the coil, and
   generating current in the coil and thereby providing induction heating of the head portion.

8. The method of claim 1 wherein the step of pressing the heated head portion comprises
   pressing the heated head portion in a die press.

9. The method of claim 3 wherein the step of pressing the heated head portion comprises
   forming a depressed central area in the head portion, and
   forming a radially extending flange on the outer surface of the head portion.

10. The method of claim 1 further comprising quenching the pressed head portion.

11. The method of claim 1 further comprising quenching the pressed head portion to room temperature.

12. The method of claim 1 further comprising quenching the pressed head portion in an oil bath.

13. The method of claim 10 further comprising piercing the quenched head portion.

14. The method of claim 10 further comprising piercing the quenched head portion in a die punch.

15. The method of claim 3 further comprising
quenching the pressed head portion, and
piercing the quenched head portion to provide a central opening therethrough.

16. The method of claim 9 further comprising
quenching the pressed head portion, and
piercing the quenched head portion by removing the depressed central area.

17. The method of claim 16 further comprising
removing the radially extending flange from the head portion.

18. A rod end produced by the process of claim 1.

19. A rod end produced by the process of claim 9.

20. A rod end produced by the process of claim 13.

21. A rod end produced by the process of claim 15.

22. A rod end produced by the process of claim 17.

23. The method of claim 1 wherein the rod end blank is formed from said rod stock on a cold header.

24. The method of claim 35 wherein the rod portion is provided with an axial male screw connection.

25. The method of claim 1 wherein the step of heating the head portion comprises heating the head portion for a first period of time, cooling the head portion for a second period of time, and reheating the head portion for a third period of time, 26. The method of claim 1 wherein the head portion is heated by induction.

* * * * *